(12) United States Patent
Barker et al.

(10) Patent No.: US 8,584,144 B2
(45) Date of Patent: Nov. 12, 2013

(54) DETERMINING THE PROCESSING ORDER OF A PLURALITY OF EVENTS

(75) Inventors: Kevin Barker, Raleigh, NC (US); Hanaa Hammad, Cairo (EG); Mohamed S. Ghareeb Hegazy, Cairo (EG); Tamer Mahfouz, Cairo (EG)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/410,021

(22) Filed: Mar. 1, 2012

(65) Prior Publication Data

US 2012/0167105 A1    Jun. 28, 2012

Related U.S. Application Data

(63) Continuation of application No. 12/307,867, filed as application No. PCT/EP2007/054109 on Apr. 26, 2007.

(30) Foreign Application Priority Data

Jul. 7, 2006   (EP) .................................... 06116802

(51) Int. Cl.
   *G06F 9/54*   (2006.01)
(52) U.S. Cl.
   USPC ....................................................... 719/318

(58) Field of Classification Search
   USPC ....................................................... 718/318
   See application file for complete search history.

(56) References Cited

U.S. PATENT DOCUMENTS

| | | | |
|---|---|---|---|
| 6,421,701 B1 | 7/2002 | Elnozahy | |
| 6,920,474 B2 | 7/2005 | Walsh et al. | |
| 7,673,302 B1 * | 3/2010 | Katzer | 718/101 |
| 2003/0093499 A1 | 5/2003 | Messinger | |
| 2003/0110230 A1 * | 6/2003 | Holdsworth et al. | 709/207 |
| 2004/0117801 A1 * | 6/2004 | Eibach et al. | 719/314 |
| 2005/0096966 A1 * | 5/2005 | Adi et al. | 705/10 |
| 2006/0070083 A1 | 3/2006 | Brunswig et al. | |
| 2007/0005410 A1 | 1/2007 | Kasravi et al. | |
| 2007/0150075 A1 | 6/2007 | Dumas et al. | |
| 2007/0226231 A1 * | 9/2007 | Venkat | 707/100 |

FOREIGN PATENT DOCUMENTS

EP   0849921 B1   6/1998

* cited by examiner

*Primary Examiner* — H S Sough
*Assistant Examiner* — Brian W Wathen
(74) *Attorney, Agent, or Firm* — Steven L. Nichols; Van Cott, Bagley, Cornwall & McCarthy P.C.

(57) ABSTRACT

A method for operating a multi-threading computational system includes: identifying related events; allocating the related events to a first thread; allocating unrelated events to one or more second threads; wherein the events allocated to the first thread are executed in sequence and the events allocated to the one or more second threads are executed in parallel to execution of the first thread.

17 Claims, 6 Drawing Sheets

US 8,584,144 B2

DETERMINING THE PROCESSING ORDER OF A PLURALITY OF EVENTS

RELATED APPLICATION

The present application is a continuation of, and claims priority under 35 U.S.C. §120 from, U.S. application Ser. No. 12/307,867, filed Jan. 7, 2009 by Barker et al, entitled "DETERMINING THE PROCESSING ORDER OF A PLURALITY OF EVENTS," which claims the priority under 35 U.S.C. 119 of previous International Patent Application No.: PCT/EP2007/054109, filed Apr. 26, 2007, which claims priority to European Patent Application No. 06116802.7 filed Jul. 7, 2006, which applications are incorporated herein by reference in its entirety.

BACKGROUND OF THE INVENTION

A thread is a single sequential flow of control within a software program. Threads provide a mechanism for splitting a computational task into two or more simultaneous operations. Multithreading is a programming and execution model that allows multiple threads to exist within the context of a single computer system, sharing the systems' resources but able to execute independently. Multithreading can allow a computational task to be executed more quickly, distributed among various computing elements, and more efficiently utilize available resources.

However, a computational task may be required to execute in a particular sequence or maintain specific relationships. When such a computation task is divided into multiple threads that execute simultaneously, the required sequence or relationships can be violated. The violation of these constraints results in an incorrect or incomplete result. Consequently, maintaining the desired sequencing and relationships during execution of a computational task in a multithreaded system can be an important challenge.

BRIEF SUMMARY OF THE INVENTION

A method for operating a multi-threading computational system includes: identifying related events; allocating the related events to a first thread; allocating unrelated events to one or more second threads; wherein the events allocated to the first thread are executed in sequence and the events allocated to the one or more second threads are executed in parallel to execution of the first thread. A system for allocating incoming events among operational groups to create a multi-treaded computation process includes: incoming events; an event processing system configured to receive the incoming events; an event key generator within the event processing system, the event key generator being configured to generate event keys at run time, the event keys being associated with the incoming events; and a thread dispatcher, the thread dispatcher allocating the incoming events among the operational groups according to the associated incoming event keys.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION OF THE INVENTION

Figure 1:
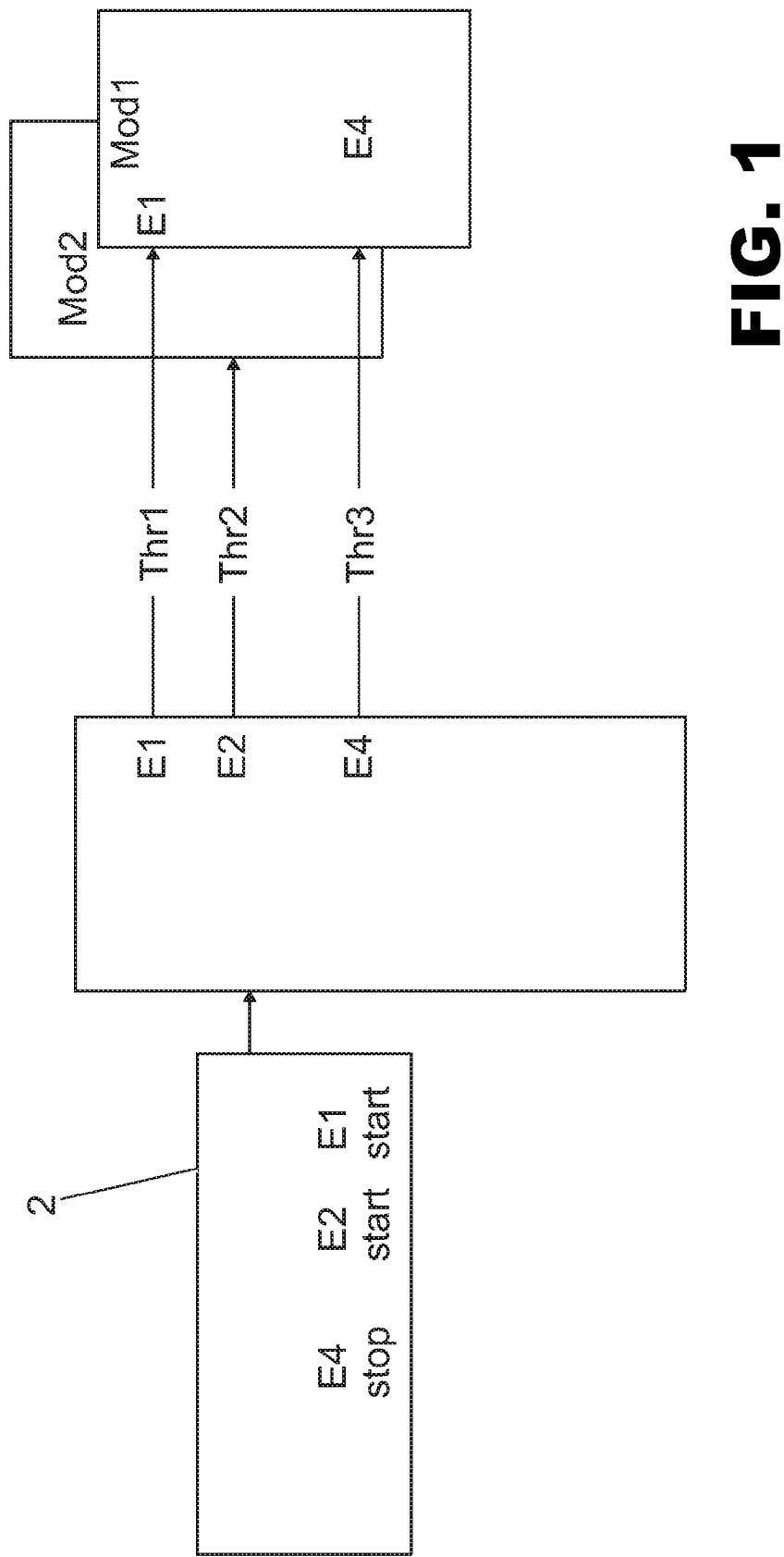
FIG. 1 is a block diagram of an illustrative processing of events by a multithreaded system, according to one embodiment of principles described herein.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

For simplicity, the system for determining the processing order of a plurality of events will be referred to henceforth as the event processing system. Similarly, the method for determining the processing order of a plurality of events will be referred to henceforth as the event processing method.

A. Allocating Events to Threads

As discussed above, a thread is a single sequential flow of control within a program. Threads provide a mechanism for splitting a program into two or more simultaneously running tasks. Multithreading is a programming and execution model that allows multiple threads to exist within the context of a single process, sharing the computational system's resources allocated to the process, but able to execute independently.

A single program can perform a particular set of operations in different contexts, such as the operations for processing the orders from different customers (e.g. customer X and customer Y). A process instance is a collection of threads and data that represents an executing business process. Using the above example, a first instance (INST1) of the order processing process could process the orders of customer X and a second instance (INST2) of the order processing process could process the orders of customer Y.

Unrelated process instances are process instances pertaining to contextually unrelated operations. In other words, INST1 is unrelated to INST2 because the operations for processing the orders of customer X should not be performed on the orders of customer Y. It should be noted that process instances may be considered related if the operations to which they pertain are temporally (or otherwise) dependent on each other. For example, consider a process instance (INST_flight) for reserving a flight for a customer X and a process instance (INST_hotel) for reserving a hotel room for the same customer X. In this case, INST_flight is related to INST_hotel insofar as customer X is unlikely to want his hotel reservation maintained if he cancels his flight reservation.

Events are manifestations of systems operations that represent the onset, evolution, and conclusion of processes. Thus, an event is a data-containing structure used to communicate information from one program (or part thereof) to another. Events have types and names (used for filtering). For example, events that are used to start, stop or perform any other operations related to a state transition of a process are considered to be events of the same type. Other types of events contain data and/or perform human interaction activities.

A module is a program that waits for the receipt of an event before performing an action. The action could be to start processing, stop processing, perform calculations or trigger other actions such as the creation of a new process instance. Returning to the order processing example, the operations of receiving an order, preparing a shipment and calculating the required payment are similar in INST1 and INST2. However, as will be recalled INST1 and INST2 are unrelated (insofar as they pertain to different customers). Thus, an event that starts INST1 (i.e. order processing for customer X) should not be delivered to the module that starts INST2 (i.e. the process instance that handles customer Y's order).

Assuming that events are emitted from a source in sequence; and the transport layer (which is responsible for transmitting the events to an application) preserves this sequence; it is not possible to guarantee that an application will preserve the event sequence unless a single thread processes all the events. However, the processing of all such events by a single thread may add latency to a program, which may affect its overall performance. But if the events are processed by multiple threads, there is no guarantee that their processing will yield correct results.

For example, let a first event be used to create a record in a database and a later second event be used to change the value of a field in the record. If the first and second events are received out of sequence, a record will not have been created in the database on receipt of the second event. As a result, the required record will not be found in the database and nothing will be done on receipt of the second event. Accordingly, since the first event is received later, the value of the field that should have been modified by the second event will contain wrong information.

FIG. 1 is a block diagram of an illustrative processing of events by a multithreaded system, including allocating events to threads. FIG. 1 shows three events which are issued from an event queue 2, namely a START event (E1), a STOP event (E4) and a further START event (E2). It is up to the operating system to dispatch an event to any available threads, but for the present example, let a first, second, and third thread (Thr1, Thr2, and Thr3) process the events E1, E2, and E4 respectively. Further, let a first program module (Mod1) receive Thr1 and Thr3 and let a second program module (Mod2) receive Thr2. If Thr3 is processed by the operating system faster than Thr1, Mod1 may receive E4 (i.e. the STOP event) before E1 (i.e. the START event).

To solve this problem it is important to distribute events amongst a pool of threads so that related events are processed by the same thread. In other words, referring to FIG. 1, the above problem could have been avoided if E1 (i.e. the START event) and E4 (i.e. STOP event) were processed on the same thread, even if E2 was processed on a separate thread (as long as Mod1 and Mod2 are unrelated).

B. Event-Based Modeling Systems

In the context of business modeling, an observation model (OM) is a mathematical model that is designed to monitor the operation of business processes. In the business world, the term process is understood to mean a set of tasks to be performed. However, in the context of observation modeling, both a process and its component tasks are known as monitored contexts (MCs). Accordingly, an OM may contain nested MCs (or a hierarchy of MCs), such as a process containing a task.

An OM is typically constructed for a defined business process from events that have been previously identified from business criteria provided by the business user. The OM explicitly or implicitly represents correlations between the events and the eventual result of the process. For the sake of simplicity, the eventual result of a modeled process will be known henceforth as a process result (PR).

C. Overview of an Illustrative Embodiment

The event processing system and method employs an observation model (OM) of an application to identify related events and thereby distribute events amongst a plurality of threads so that related events are allocated to the same thread. By employing an OM to determine the relationships between events, the event processing system and method avoids the necessity of relying on information from the user to determine if events are related. To facilitate the following discussion, an illustrative OM specified by the Business Operation Meta-Model (BOM) will be provided and the operations of the event processing system and method described with reference to this OM. However, it will be appreciated that the BOM is used for example purposes only. In particular, it will be appreciated that the event processing system and method is equally applicable to other business models and other applications such as error handling. In view of the more generic application of the present invention, the term operational group will be used to describe any process or task within an application. In a similar fashion, it will be understood that the specific OM structure discussed below, is provided solely for the ease of understanding the event processing system and method. In particular, the inclusion of the exemplary OM structure in the following discussion should be in no way construed as a limitation of the event processing system and method to that OM structure. Instead, it will be understood that the event processing system and method is equally applicable to OMs with different structures.

Having described the exemplary OM, the description will turn to the architecture of the event processing system in relation to the other components of a multi-threading system, (i.e. the thread dispatcher and recipient application). The description will then finish with a detailed discussion of the operations of the event processing method.

D. Illustrative Observation Model (OM)

Figure 2A:
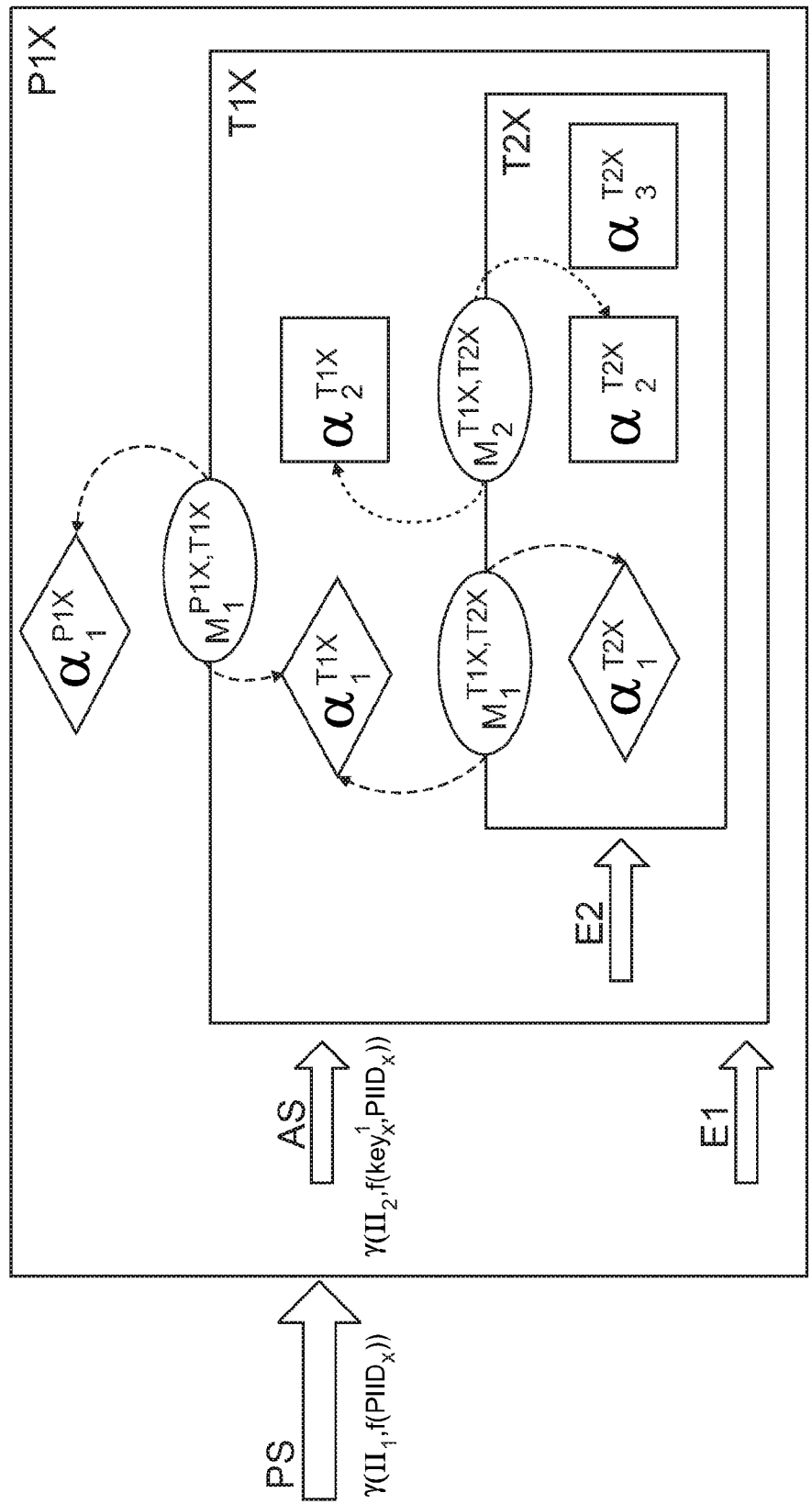
FIGS. 2a and 2b are block diagrams of an illustrative Observation Model (OM) for the activities of processing the orders of a customer X and a customer Y, respectively, according to one embodiment of principles described herein.
Figure 2B:
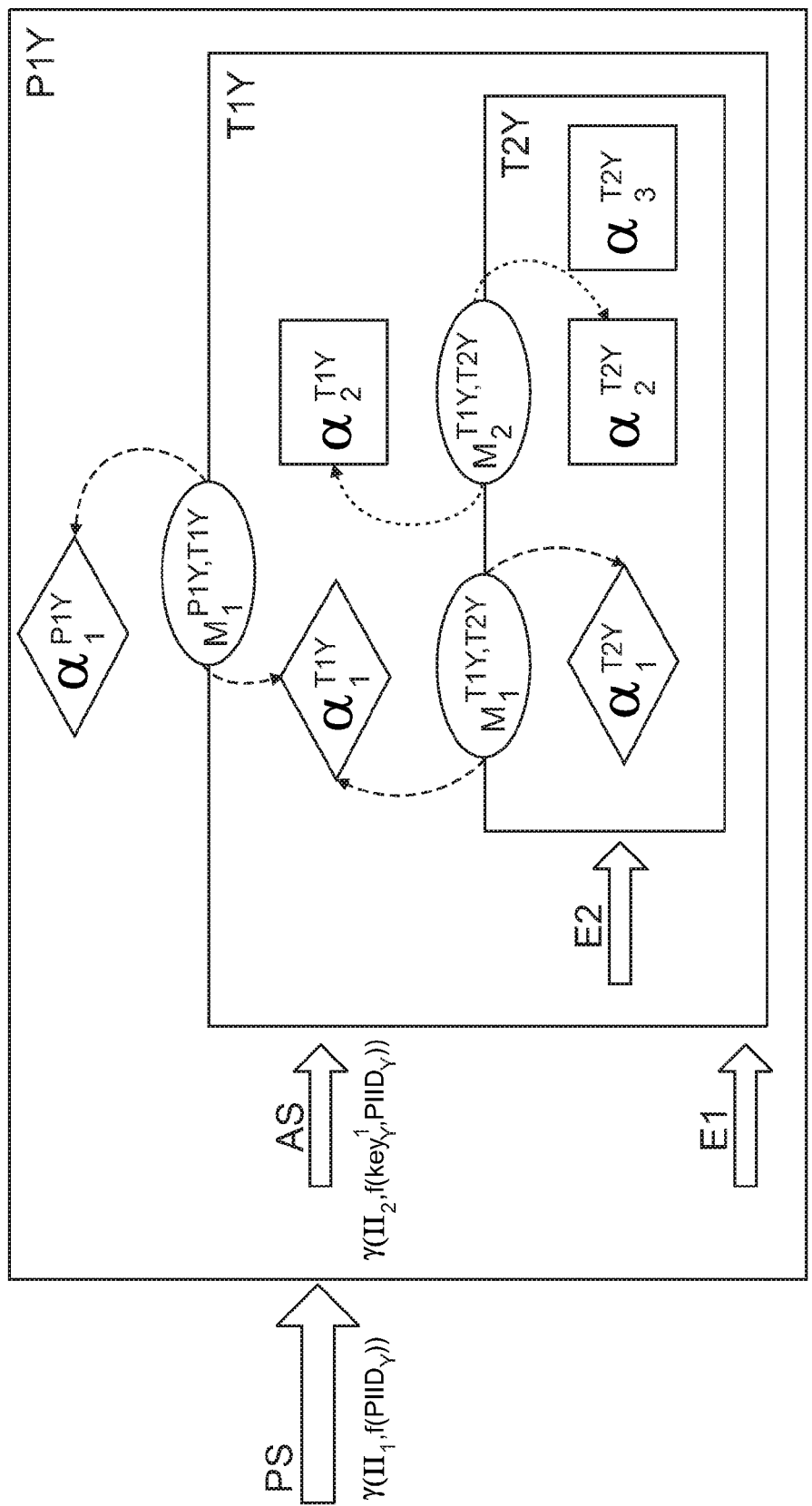

FIGS. 2a and 2b are block diagrams of an illustrative Observation Model (OM) for the activities of processing the orders of a customer X and a customer Y, respectively, according to one embodiment of principles described herein. Let an OM for the processing of an order comprise a simple process P1, containing a block T1 and a task T2. Accordingly, P1, T1 and T2 are the Monitored Contexts (MCs) of the model. P1, T1 and T2 are organized in a hierarchical (or nested) fashion wherein P1 has no parent MC, T1 has P1 as a parent MC and T2 has T1 as a parent MC. For simplicity, an MC without a parent MC will be known henceforth as a root MC and subsequently nested MCs will be denoted as first, second, third level etc. MCs depending on their degree of nesting from the root MC. Accordingly, referring to the present example, P1 is the root MC, T1 is a first level MC and T2 is a second level MC.

The above OM can be extrapolated to cover multiple process instances, in which case, the MCs associated with a particular process instance will be known henceforth as MC instances. Referring to FIG. 2a, the process instance for processing the orders of customer X comprises the nested MC instances P1X, T1X, and T2X. Similarly, FIG. 2b illustrates the process instance for processing the orders of customer Y which comprise the nested MC instances P1Y, T1Y, and T2Y. To maintain consistency with the previous discussions, MCs associated with the same process instance will be known henceforth as related MC instances. In other words, P1X, T1X and T2X are related MC instances (as are P1Y, T1Y, and T2Y). However, since, for example, P1X and P1Y pertain to unrelated process instances (i.e. processing the orders of customer X and Y) P1X and P1Y are unrelated MC instances.

Each MC is provided with one or more keys that inter alia represent the nesting relationships between related MCs. A root MC may possess one or more keys of different types. However, each child MC includes a copy of the keys from its parent together with other keys of its own. In other words, each child MC inherits keys from its parent. Accordingly, the number of inherited keys that an MC possesses reflects the degree of nesting of the MC.

For the sake of example, let the root MC instance P1X possess a single key $\alpha_1^{P1X}$. Further, let the first level MC instance T1X possess two keys $\alpha_1^{T1X}$ and $\alpha_2^{T1X}$ (wherein $\alpha_1^{T1X}$ is inherited from P1X) and the second level MC instance T2X possess three keys $\alpha_1^{T2X}$, $\alpha_2^{T2X}$ and $\alpha_3^{T2X}$ (wherein $\alpha_1^{T2X}$ and $\alpha_1^{T2X}$ are inherited from T1X). It will be appreciated that the OM described above serves as an example only and that other key inheritance patterns are possible. For example, any given level MC may possess more than one key of its own in addition to the keys it inherited from its parent MC.

As mentioned above, a root MC may possess a number of different instance keys of different type. One of such keys is known as a Process Instance Identifier (PIID). Since each MC instance in a hierarchy inherits this instance key from the root MC, these keys will be known henceforth as common keys, insofar as the common keys are common to all of the MCs in a given hierarchy. Consequently, the keys of a root MC instance can be used to identify related MC instances in a hierarchy. For example, let the keys $\alpha_1^{P1X}$ and $\alpha_1^{P1Y}$ of the root MC instances P1X and P1Y shown in FIGS. 2a and 2b, be denoted by $PIID_X$ and $PIID_Y$ respectively. Since $\alpha_1^{T1X}$ is inherited from P1X, $\alpha_1^{T1X}$ attains the value $PIID_X$. As will be recalled, $\alpha_1^{T2X}$ is inherited from T1X. Accordingly, let $\alpha_1^{T2X}$ attain the value $PIID_X$ (inherited from $\alpha_1^{T1X}$) and in an analogous fashion, let $\alpha_1^{T1Y}$ and $\alpha_1^{T2Y}$ attain the value $PIID_Y$. To complete the demonstration of key inheritance, let $\alpha_2^{T1X}$ attain the value $key^1_x$. In this case, $\alpha_2^{T2X}$ inherits the same value (i.e. $\alpha_2^{T2X} = key^1_x$) and the remaining key in T2X (i.e. $\alpha_3^{T2X}$) attains the value $key^2_x$. For simplicity, a key whose value has been inherited from a parent MC will be known henceforth as an inherited key.

A model relationship map is a map between the keys and inherited keys of a pair of parent-child MCs. For example, the relationship between P1X and T1X is represented by the $M_1^{P1X,T1X}$ model relationship map which forms a mapping between the keys $\alpha_1^{P1X}$ and $\alpha_1^{T1X}$. Similarly, the model relationship map $M_1^{T1X,T2X}$ forms a mapping between the keys $\alpha_1^{T1X}$ and $\alpha_1^{T2X}$ and model relationship map $M_2^{T1X,T2X}$ forms a mapping between keys $\alpha_2^{T1X}$ and $\alpha_2^{T1X}$. Corresponding model relationship maps exist for the MCs of the process instance for processing the orders of customer Y.

Arrows on the left of each MC represent events that must be processed by the MC. For example, the root MC instance P1X must process the event PS (or process start event) and the MC instance T1X must process the AS (activity start) and E1 events. Similarly, the MC instance T2X must process the event E2.

Each event received by an OM is provided with a correlation predicate, which identifies the MC to which the event should be transmitted. Accordingly, a correlation predicate comprises two parts, namely an event field and an MC field. The event field provides a property (e.g. "orderID") of the event (wherein this property will be known henceforth as an event property) and the MC field identifies an MC instance by means of its instance keys. For example, the event field of the correlation predicate $\gamma(\Pi_1, f(PIID_x))$ is $\Pi_1$ and the MC field is $f(PIID_x)$.

Referring to the present example, the correlation predicate $\gamma(\Pi_1, f(PIID_x))$ relates to an event with property $\Pi_1$ which must be transmitted to an MC whose identity is a function PIID$_x$ only. In other words, the event must be transmitted to P1X. Similarly, the correlation predicate $\gamma(\Pi_2, f(key^1_x, PIID_x))$ relates to an event with property $\Pi_2$ which must be transmitted to an MC whose identity is a function of key$^1_x$ and PIID$_x$. In other words, the event must be transmitted to T1X. Analogous correlation predicates exist for the events associated with the process instance for processing the orders of customer Y.

To operate an accurate model of a business process, the sequence of events pertaining thereto must be correctly received by the model. In particular, all events relating to a given process instance must be received in sequence. For example, it would be incorrect for an OM to receive an event indicating the termination of a process instance before receiving an event indicating the start of the process instance. For simplicity, the events associated with a given MC and its children in a particular process instance will be known henceforth as related events. For example, if an event is correlated to a task within a process instance, the event is also associated with the root MC of the process instance. In keeping with the previous discussions, it is important to preserve event sequence across a hierarchy of MCs from the same process instance.

E. Architecture of the Event Processing System

Figure 3:
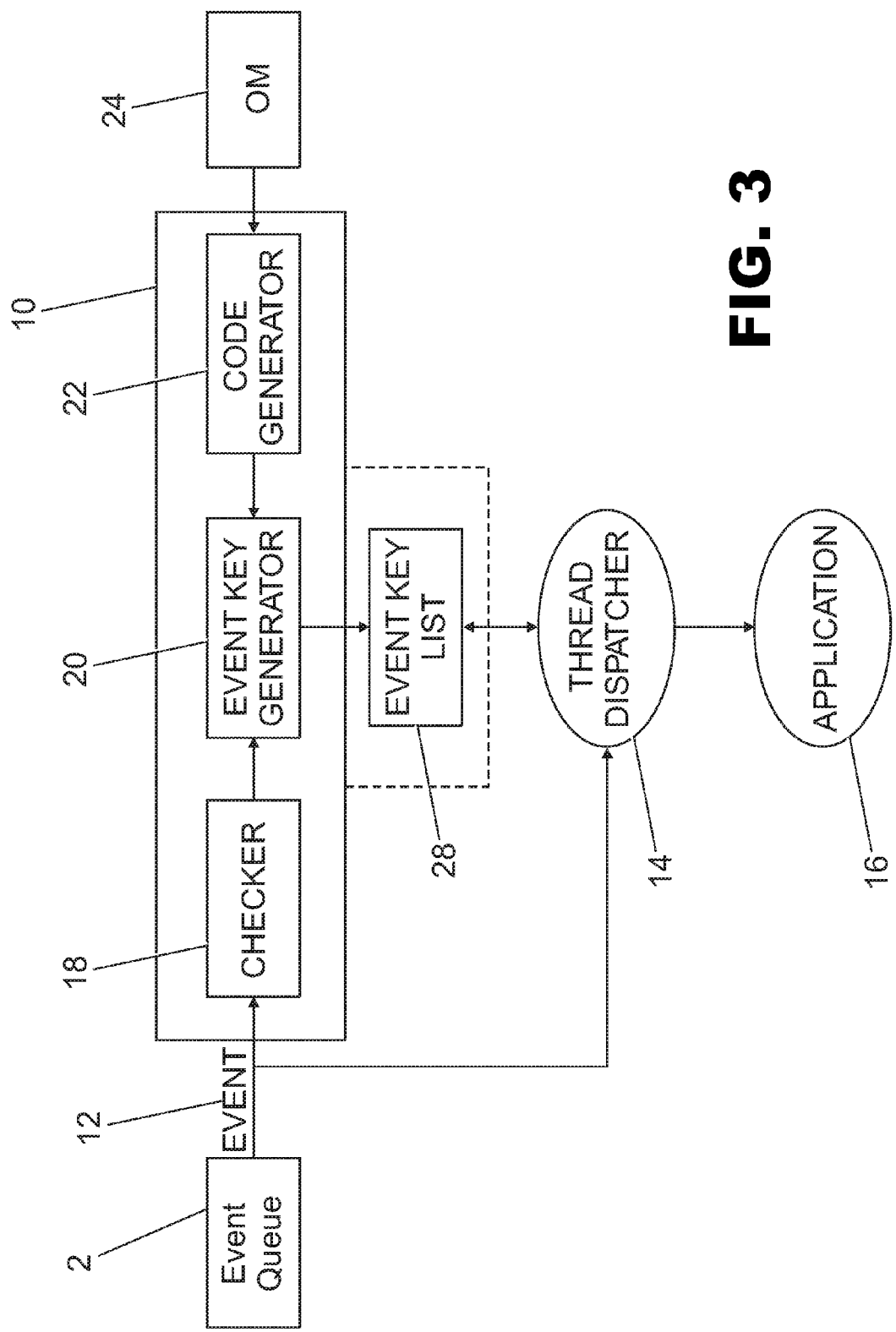
FIG. 3 is a block diagram of an illustrative event processing system, according to one embodiment of principles described herein.

FIG. 3 is a block diagram of an illustrative event processing system. As shown in FIG. 3, the event processing system (10) intervenes between incoming events (12) and a thread dispatcher (14), wherein the thread dispatcher (14) allocates the events (12) to a plurality of threads for transmission to a recipient application (16).

The event processing system (10) comprises a code generator (22) that operates (during a preparation phase) on an OM (24) of the application to generate a program known as an event key generator (20). The event processing system (10) further comprises a checker (18), which operates during run-time to check the name and type of incoming events (12) (from an event queue 2). The previously mentioned event key generator (20) also operates at run-time to generate event keys for the incoming events on the basis of event properties in the events' correlation predicates.

The event key generator (20) deposits the event keys in an event key list (28). The thread dispatcher (14) uses the event keys from the event key list (28) to determine whether an incoming event (12) is related to previously received events. If the incoming event (12) is found to be so related, the thread dispatcher (14) allocates the incoming event and previously received events to the same thread for transmission to the application (16).

F. Event Processing Method

1. Overview

The event processing method can be divided into an initial preparation phase and a run-time phase. During the preparation phase, the common keys of the MCs in an OM are identified. The correlation predicates of all the events defined in an OM are analyzed to identify event properties that map to the common keys. Software instructions are produced, for execution during run-time, to generate event keys for incoming events. A thread dispatcher uses the event keys to identify related events and allocate such events to a same thread. A more detailed description of the preparation and run-time phase operations follow.

2. Preparation Phase

Figure 4:
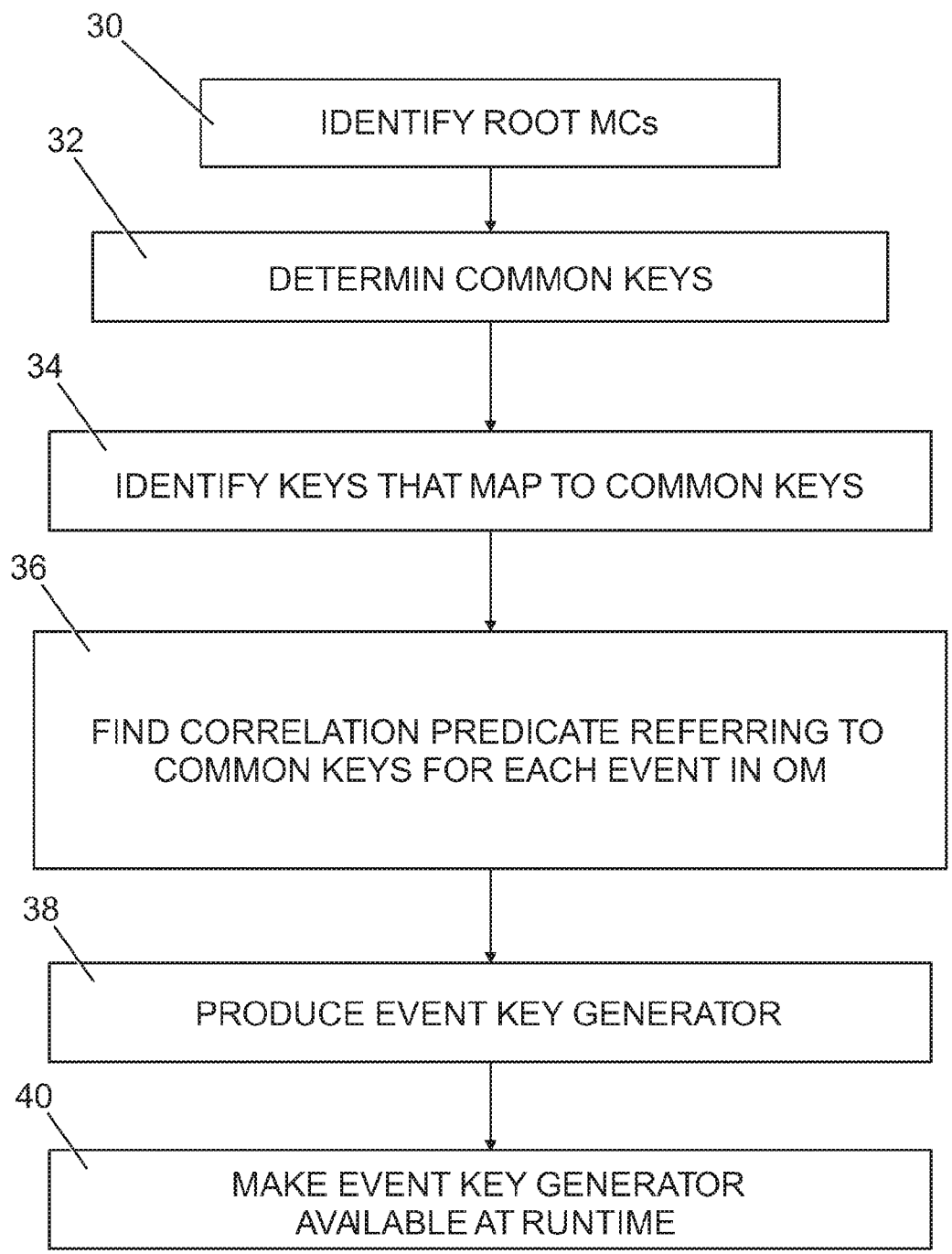
FIG. 4 is a flow chart of an illustrative preparation phase of an event processing method, according to one embodiment of principles described herein.

Referring to FIGS. 2, 3, and 4, the event processing method parses an OM of an application and identifies hierarchies therein. The root MCs of the hierarchies are then identified (step 30, FIG. 4) and the common keys of the hierarchies determined therefrom (step 32, FIG. 4).

Model relationship maps in the OM are then used to analyze the keys of each child MC and identify (step 34, FIG. 4) the keys that map to the T1X common key(s). For example, the method identifies keys $\alpha_{T1X}$ and $\alpha_1^{T2X}$ that map to common key $\alpha_1^{P1X}$.

Each of the events defined in the OM is analyzed to identify the event properties that map to the common keys of the corresponding MCs (step 36, FIG. 4). The event key generator (20, FIG. 3) is then produced (step 38, FIG. 4) (using the previously identified event properties) and is made available (step 40, FIG. 4) for execution during the run-time phase.

3. Run-Time Phase

Figure 5:
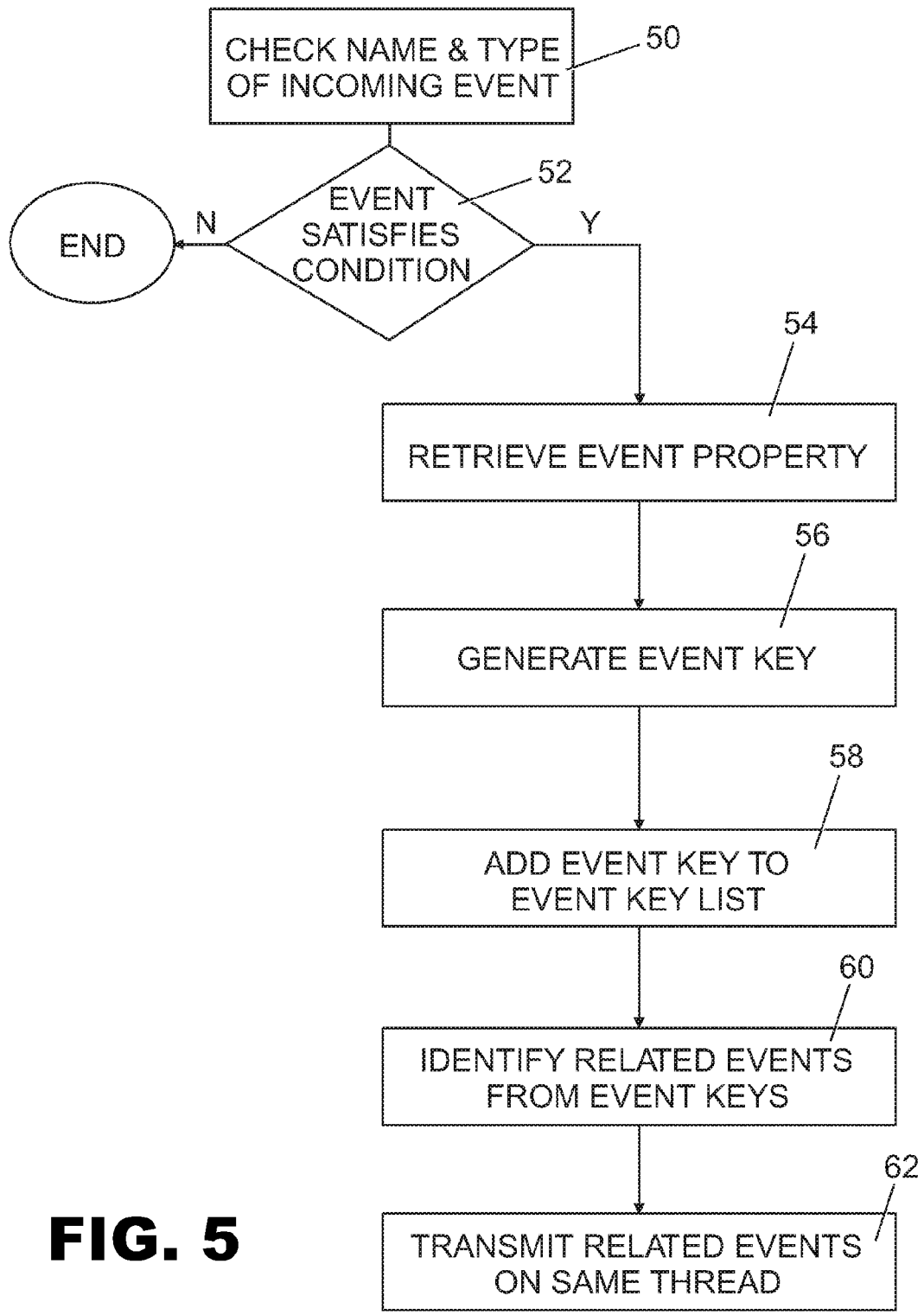
FIG. 5 is a block diagram of an illustrative run-time phase of an event processing method, according to one embodiment of principles described herein.

Referring to FIGS. 2, 3, and 5, on receipt of an event, the name and type of the event are checked (step 50, FIG. 5). If the event satisfies a pre-defined type and filter condition (step 52, FIG. 5), the event property that maps to its common key(s) is retrieved (step 54, FIG. 5) (from the event's correlation predicate) and the event key generator (20, FIG. 3) is executed to generate (step 56) an event key $\epsilon$ for the event.

The event key $\epsilon$ is a combination of the name of the MC to which the event should be transmitted and the identified event property. For example, as will be recalled, the correlation predicate for event PS when transmitted to P1X is given by $\gamma(\Pi_1, f(PIID_x))$. In this case, P1X is the root MC instance and the common key of the associated MC instance hierarchy is $\alpha_1^{P1X}$.

If we assume $\Pi_1$ is the event property that maps to the common $\alpha_1^{P1X}$, the event key for the event PS is (P1, $\Pi_1$). Similarly, the correlation predicate for event AS when transmitted to T1X is $\gamma(\Pi_1, f(key^1_x, PIID_x))$. As will be recalled from FIG. 2a, T1X is a child task of P1X. Accordingly, P1X is the root MC of the hierarchy in which T1X is a member. Thus, the common key of T1X is $\alpha_1 P1X/\alpha_1^{T1X}$. If we assume that $\Pi_2$ is the event property that maps to the root key, then the event key of AS is (P1, $\Pi_1$).

For a hierarchy of MCs, the name of the root MC is used instead of the names of each of its children. In other words, the event key $\epsilon$ comprises the pair (root MC name, event property). Thus, events pertaining to related child MCs have the same event key $\epsilon$ pair (root MC name, event property). The event property is not the only parameter used to define an event key ϵ, since two unrelated MCs could potentially generate event keys with the same value. For example, in an order processing process the event property could be an order number of value 8678. However, in a claims handling process for insurance claims the event property could be a "claim number" of value 8678. To avoid this problem, the name of the recipient MC is also used to define 56 the event key ϵ.

In the event of there being multiple event properties, the properties are concatenated in the same order as that of the events leading to the event properties. For example, if an event property comprises two elements (e.g. customer name and store name) these elements are concatenated together to form an event property that identifies the process instance. The event key is then added (step 58, FIG. 5) to the event key list (28, FIG. 3). The thread dispatcher (14, FIG. 3) uses the event key list (28, FIG. 3) to identify (step 60) related events on the basis that related events possess event keys with the same root MC name.

Thus, the thread dispatcher (14, FIG. 3) determines whether a received incoming event (12, FIG. 3) is related to other previously received events by comparing the event key of the incoming event with the event keys in the event key list (28, FIG. 3). The thread dispatcher (14, FIG. 3) allocates the incoming event to a thread accordingly. More particularly, events that have the same event key (root MC name, event property) are transmitted (step 62, FIG. 5) on the same thread, whereas events that have different event keys are processed in parallel.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various Modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for operating a multi-threading computational system comprising:
   assigning an event key to an incoming event;
   identifying related events based on assigned event keys of received events;
   allocating said related events to a first thread;
   allocating unrelated events to a second thread;
   wherein said related events allocated to said first thread are executed by a computer in sequence and said unrelated events allocated to said second thread are executed by said computer in parallel to execution of said first thread;
   wherein identifying related events is reliant on information derived from a model of a recipient application which processes said related events; and
   wherein said information is derived from said model of said recipient application by:
   identifying a hierarchy of a plurality of operational groups in said model;
   identifying a feature shared by each operational group within said hierarchy;
   identifying said shared feature using an identifier; and
   identifying incoming events associated with said shared feature by tagging said incoming events with said identifier; and
   allocating said incoming events associated with said shared feature to said operational group sharing said shared feature.

2. The method of claim 1, wherein identifying related events comprises:
   determining a property of an incoming event that relates to said feature shared by said operational groups in the hierarchy of which said operational group that processes said related event is a member;
   executing an instruction generated during an earlier preparation process to generate a key for an incoming event; and
   comparing the key of the incoming event with those of previously received events; wherein events with matching keys are considered to be related.

3. A method for operating a multi-threading computational system comprising:
   assigning an event key to an incoming event;
   identifying related events based on assigned event keys of received events;
   allocating said related events to a first thread;
   allocating unrelated events to a second thread;
   wherein said related events allocated to said first thread are executed by a computer in sequence and said unrelated events allocated to said second thread are executed by said computer in parallel to execution of said first thread; and wherein instances within said multi-threading system are identified by instance keys, each said event key containing information derived from an instance key; said incoming events being allocated among said instances according to said event key.

4. The method of claim 3, wherein said method is performed at run-time.

5. The method of claim 3, wherein identifying related events is reliant on information derived from a model of a recipient application which processes said related events.

6. The method of claim 3, wherein said instances are contained within a hierarchal structure wherein a root instance contains a nested instance.

7. The method of claim 6, wherein a common key associated with said root instance is included within said keys of said nested instance.

8. The method of claim 7, further comprising:
identifying said root instance with said hierarchal structure;
identifying said common keys within said hierarchal structure;
identifying incoming events that map to said common key by including information derived from said common key in said event key assigned to each incoming event; and
allocating said incoming events having event keys containing similar information to an observation model containing said root instance with an associated common key.

9. The method of claim 8, further comprising:
producing an event key generator configured to generate event keys for incoming events;
making said event key generator available at run time; and
said event key generator generating said event keys for said incoming events.

10. The method of claim 9, wherein said event key comprises a name of a root operational group of the hierarchy and a property of said incoming event.

11. A method for creating a multi-threading computational process comprises:
identifying a root instance with a hierarchal instance structure, said root instance sharing a common key with nested child instances;
identifying said common key;
producing an event key generator configured to generate event keys for incoming events;
making said event key generator available at run time on a computer; said event key generator generating event keys for said incoming events on said computer;
identifying incoming events that share event keys, wherein said event keys comprise a name of said root instance and a property of said incoming event; and
allocating said incoming events having shared event keys to an associated root instance having a matching common key.

12. A method for allocating incoming events among a plurality of different operational groups in a multi-threaded computation process, said method comprising:
receiving incoming events with an event processing system;
with an event key generator within said event processing system, generating an event key for each event received; and
with a thread dispatcher, within said event processing system, allocating said incoming events among said operational groups according to said associated incoming event keys, wherein said thread dispatcher uses said event keys to determine if an incoming event is related to any previously received event, and, if said incoming event is related to a previously received event, said thread dispatcher allocates said incoming event to a same, single thread as said previously received related event;
wherein said operational groups comprise a number of instances, said instances having a hierarchal structure, said hierarchal structure comprising a root instance, said root instance comprising a nested instance.

13. The method of claim 12, wherein each of said instances have an instance key, said root instance having a common key, said common key being shared among said nested instance.

14. The method of claim 13, wherein said event keys comprise said information derived from said common key and a property of said incoming event.

15. A method for allocating incoming events among a plurality of different operational groups in a multi-threaded computation process, said method comprising:
receiving incoming events with an event processing system;
with an event key generator within said event processing system, generating an event key for each event received; and
with a thread dispatcher, within said event processing system, allocating said incoming events among said operational groups according to said associated incoming event keys, wherein said thread dispatcher uses said event keys to determine if an incoming event is related to any previously received event, and, if said incoming event is related to a previously received event, said thread dispatcher allocates said incoming event to a same, single thread as said previously received related event;
further comprising generating said event key generator with a code generator that is using information derived from a model of a recipient application.

16. The method of claim 15, further comprising generating an event key list, said event key list being generated by said event key generator, said thread dispatcher comparing an event key for an incoming event to event keys from said event key list to determine whether said incoming event is related to a previously received event.

17. A method for allocating incoming events among a plurality of different operational groups in a multi-threaded computation process, said method comprising:
receiving incoming events with an event processing system;
with an event key generator within said event processing system, generating an event key for each event received; and
with a thread dispatcher, within said event processing system, allocating said incoming events among said operational groups according to said associated incoming event keys, wherein said thread dispatcher uses said event keys to determine if an incoming event is related to any previously received event, and, if said incoming event is related to a previously received event, said thread dispatcher allocates said incoming event to a same, single thread as said previously received related event;
wherein said event key comprises an indication of a managed context among said operational groups to which a corresponding event is to be transmitted and an indication of an identified property of said corresponding event.

* * * * *